US006690506B2

(12) United States Patent
Zahnley et al.

(10) Patent No.: US 6,690,506 B2
(45) Date of Patent: Feb. 10, 2004

(54) CONTROL ARCHITECTURE AND METHOD FOR OPTICAL AMPLIFIERS

(75) Inventors: Timothy Zahnley, Spencer, NY (US); Aravanan Gurusami, Painted Post, NY (US); Timothy W. T. Qian, Corning, NY (US); Muhidin Lelic, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/945,153

(22) Filed: Aug. 31, 2001

(65) Prior Publication Data

US 2002/0176156 A1 Nov. 28, 2002

Related U.S. Application Data

(63) Continuation-in-part of application No. 09/860,021, filed on May 17, 2001.
(60) Provisional application No. 60/303,969, filed on Jul. 9, 2001.

(51) Int. Cl.[7] .............................. H01S 3/16; H04B 10/12
(52) U.S. Cl. ............... 359/337.11; 359/160; 359/341.3; 359/341.41
(58) Field of Search .................. 359/134, 160, 359/334, 337.11, 341.3, 341.41, 341.42

(56) References Cited

U.S. PATENT DOCUMENTS

| 5,117,196 A | | 5/1992 | Epworth et al. ............ 359/333 |
| 5,664,131 A | * | 9/1997 | Sugiya ........................ 359/341 |
| 5,737,118 A | | 4/1998 | Sugaya et al. .............. 359/341 |
| 5,900,968 A | | 5/1999 | Srivastava et al. .......... 359/341 |
| 5,963,361 A | * | 10/1999 | Taylor et al. ................ 359/337 |
| 5,966,237 A | | 10/1999 | Sugaya et al. .............. 359/341 |
| 5,986,799 A | | 11/1999 | Itou et al. ................... 359/337 |

(List continued on next page.)

FOREIGN PATENT DOCUMENTS

JP          9-214034       *  8/1997

OTHER PUBLICATIONS

Haruo Okamura; "Automatic Optical Loss Compensation with Erbium–Doped Fiber Amplifier"; Journal of Lightwave Technology, vol. 10, No. 8, Aug. 1992; pp. 1110–1116; IEEE 1992.

(List continued on next page.)

Primary Examiner—Nelson Moskowitz
(74) Attorney, Agent, or Firm—William S. Francos; Svetlana Z. Short (57) ABSTRACT

According to an illustrative embodiment of the present invention, a method for controlling an optical amplifier is disclosed. The illustrative method includes receiving a portion of an input signal to the optical amplifier; receiving a portion of an output signal from a first amplification stage; receiving a portion of an output signal of the optical amplifier; and adjusting the first amplification stage and a second amplification stage based on the received portions to substantially control the optical amplifier.

According to another illustrative embodiment of the present invention, an optical amplifier includes a controller which receives a portion of an output signal from a first amplification stage and a portion of an output signal from the optical amplifier. The controller adjusts the first amplification stage and a second amplification stage based on the received portions of the signals.

28 Claims, 7 Drawing Sheets

U.S. PATENT DOCUMENTS

| | | | | |
|---|---|---|---|---|
| 6,023,366 | A | 2/2000 | Kinoshita | 359/341 |
| 6,025,947 | A | 2/2000 | Sugaya et al. | 359/160 |
| 6,038,063 | A | 3/2000 | Tsuda et al. | 359/341 |
| 6,108,123 | A | 8/2000 | Kinoshita | 359/337 |
| 6,111,688 | A | 8/2000 | Kobayashi et al. | 359/341 |
| 6,151,158 | A | 11/2000 | Takeda et al. | 359/341 |
| 6,163,399 | A | 12/2000 | Berg | 359/341 |
| 6,166,850 | A | 12/2000 | Roberts et al. | 359/341 |
| 6,198,571 | B1 | 3/2001 | Yang | 359/337 |
| 6,201,636 | B1 | 3/2001 | Noda | 359/337 |
| 6,215,584 | B1 * | 4/2001 | Yang et al. | 359/341 |
| 6,259,553 | B1 | 7/2001 | Kinoshita | 359/337 |
| 6,275,330 | B1 | 8/2001 | Izumi | 359/341 |
| 6,282,017 | B1 | 8/2001 | Kinoshita | 359/341.42 |
| 6,288,836 | B1 | 9/2001 | Kawasaki et al. | 359/341.42 |
| 6,373,625 | B1 * | 4/2002 | Kobayashi et al. | 359/341.41 |
| 6,441,955 | B1 * | 8/2002 | Takatsu et al. | 359/341.4 |
| 6,625,433 | B1 * | 9/2003 | Poirear et al. | 455/232.1 |
| 2002/0171917 | A1 | 11/2002 | Lelic et al. | 359/341.4 |

OTHER PUBLICATIONS

Dwight H. Richards, Janel L. Jackel, Senior Member, IEEE, and Mohamed A. Ali; A Theoretical Investigation of Dynamic All–Optical Automatic Gain Control in Multichannel EDFA's and EDFA Cascades; IEEE Journal of Selected Topics in Quantum Electronics, vol. 3, No. 4, Aug. 1997; pp. 1027–1036; IEEE 1997.

A. K. Srivastava, J.L. Zyskind, Y. Sun, J. Ellson, G. Newsome, R. W. Tkach, A. R. Chraplyvy, J. W. Sulhoff, T. A. Strasser, C. Wolf, and J. R. Pedrazzani; "Fast–Link Control Protection of Survising Channels in Multiwavelength Optical Networks"; IEEE Photonics Technology Letters, vol. 9, No. 12, Dec. 1997; pp. 1667–1669.

Seo Yeon Park, Hyang Kyun Kim, Gap Yeol Lyu, Sun Mo Kang, and Sang–Yung Shin; "Dynamic Gain and Output Power Control in a Gain–Flattened Erbium–Doped Fiber Amplifier"; IEEE Photonics Technology Letters, vol. 10, No. 6, Jun. 1998; pp. 787–789.

H. Suzuki, No. Takachio, O. Ishida, and M. Koga; "Dynamic Gain Control by Maximum Signal Power Channel in Optical Linear Repeaters for WDM Photonic Transport Networks"; IEEE Photonics Technology Letters, vol. 10, No. 5, May 1998; pp. 734–736.

H. Suzuki, N. Takachio, O. Ishida, and M. Koga; "Power Excursion Suppression in Cascades of Optical Amplifiers with Automatic Maximum Level Control"; IEEE Photonics Technology Letters, vol. 11, No. 8, Aug. 1999; pp. 1051–1053.

Hosung Yoon, Sungho Bae, Seong Joon Ahn, and Namkyoo Park; "Reference Level Free Multichannel Gain Equalization and Transient Gain Suppression of EDFA with Differential ASE Power Monitoring"; IEEE Photonics Technology Letters, vol. 11, No. 3, Mar. 1999; pp. 316–318.

Kinoshita et al. "Wide–Dynamic–Range WDM Optical Fiber Amplifiers for 32×10 Gb/s, SMF Transmission Systems", Optical Amplifiers And Their Applications, OSA TOPS vol. 25, p. 280–283.

* cited by examiner

CONTROL ARCHITECTURE AND METHOD FOR OPTICAL AMPLIFIERS

CROSS-REFERENCE TO RELATED APPLICATIONS

The present application is a continuation-in-part under 35 U.S.C. §120 of U.S. patent application Ser. No. 09/860,021, filed May 17, 2001 and entitled "Optical Amplifier Performance Controller and Method of Use." The present application claims benefit under 35 U.S.C. §119(e) of U.S. Provisional Patent Application Ser. No. 60/303,969, filed Jul. 9, 2001, and entitled "Novel Control Structure and Algorithm for DWDM Optical Amplifiers." The disclosures of the above-referenced Utility and Provisional Patent Applications are specifically incorporated by reference herein and for all purposes.

FIELD OF THE INVENTION

The present invention relates generally to optical amplifiers and more specifically to a controller for an optical amplifier and its method of use.

BACKGROUND OF THE INVENTION

The increasing demand for high-speed voice and data communications has led to an increased reliance on optical communications, especially optical fiber communications. The use of optical signals as a vehicle to carry channeled information at high speed is preferred in many instances to carrying channeled information at other electromagnetic wavelengths/frequencies in media such as microwave transmission lines, coaxial cable lines, and twisted copper pair transmission lines. Advantages of optical media include higher channel capacities (bandwidth), greater immunity to electromagnetic interference, and lower propagation loss. In fact, it is common for high-speed optical systems to have signal rates in the range of approximately several megabits per second (Mbit/s) to approximately several tens of gigabits per second (Gbit/s). However, as the communication capacity is further increased to transmit greater amounts of information at greater rates over fiber, maintaining signal integrity can be challenging.

The emergence of optical communications as a useful vehicle for short and long-haul data and voice communications has led to the development of a variety of optical amplifiers. One type of optical amplifier is the rare-earth element doped optical amplifier (rare-earth doped amplifier). One such rare-earth doped amplifier is based on erbium-doped silica fiber. The erbium doped fiber amplifier (EDFA) has gained great acceptance in the telecommunications industry. The erbium-doped fiber amplifier has a number of characteristics which make it an excellent amplifier for optical communications. These characteristics include polarization-independent gain, low interchannel cross-talk, wide optical bandwidth, and low-noise generation. In brief, the EDFA offers a useful way to compensate for signal propagation losses along high-speed fiber-optic links.

Erbium-doped fiber amplifiers (EDFA) are useful in a variety of optical transmission systems. One type of optical transmission system relies on multiplexing. One particular type of multiplexing is wavelength division multiplexing (WDM). In WDM, several information streams (voice and/or data streams) share a particular transmission medium, such as an optical fiber. Each high-speed information channel is transmitted at a designated wavelength along the optical fiber. At the receiver end, the interleaved channels are separated (de-multiplexed) and may be further processed by electronics. (By convention, when the number of channels transmitted by such a multiplexing technique exceeds approximately four, the technique is referred to dense WDM or DWDM). As WDM/DWDM gains popularity, optical amplifiers may be required to give requisite signal boost to preserve signal quality, particularly in long-haul applications.

Typically, optical amplifiers used in WDM/DWDM based systems must satisfy certain requirements. One of the requirements is that the gain of the amplifier over the operating spectrum is substantially flat with low gain tilt and a low noise figure. This requirement is often referred to as gain flatness. As can be appreciated, gain flatness is required to avoid the dominance of the power of one or more channels over the others.

Another requirement of the optical amplifier is good transient characteristics. This requirement is related to the sensitivity of the surviving signals present in the optical network to the adding or dropping of some other signals (channels). When additional channels are added, the total optical power may experience a large upward transient spike that may last up to a millisecond causing a temporary increase in the bit-error-rate (BER). If the channels are dropped, the total optical power may experience a large downward transient spike. This may also increase the BER due to effects such as receiver overload or some nonlinear phenomena, such as stimulated Brillouin scattering. In addition to the above-described affects, the amplifier may exhibit a permanent shift in gain or an unwanted power offset.

To fulfill the above illustrative requirements, it is necessary to control the optical amplifier during operation. While control mechanisms and schemes have been incorporated in conventional optical amplifiers, they have shortcomings in deployed systems. To this end, conventional controllers lack the capability to control fast gain and output power transients. Control of these transients is useful in order to avoid cross-talk between the channels caused by the adding or dropping of channels.

Accordingly, what is needed is a controller and its method of use which overcomes the drawbacks of conventional controllers described above.

SUMMARY OF THE INVENTION

According to an illustrative embodiment of the present invention, a method for controlling an optical amplifier is disclosed. The illustrative method includes receiving a portion of an input signal to the optical amplifier; receiving a portion of an output signal from a first amplification stage; receiving a portion of an output signal of the optical amplifier; and adjusting the first amplification stage and a second amplification stage based on the received portions to substantially control the optical amplifier.

According to another illustrative embodiment of the present invention, an optical amplifier includes a controller which receives a portion of an output signal from a first amplification stage and a portion of an output signal from the optical amplifier. The controller adjusts the first amplification stage and a second amplification stage based on the received portions of the signals.

DEFINED TERM

As used herein, "signal" means the optical signal plus any noise present. For example, "input signal" means the input optical signal plus any noise present.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art that the present invention may be practiced in other embodiments that depart from the specific details disclosed herein. In other instances, detailed descriptions of well-known devices and methods may be omitted so as not to obscure the description of the present invention.

Figure 1:
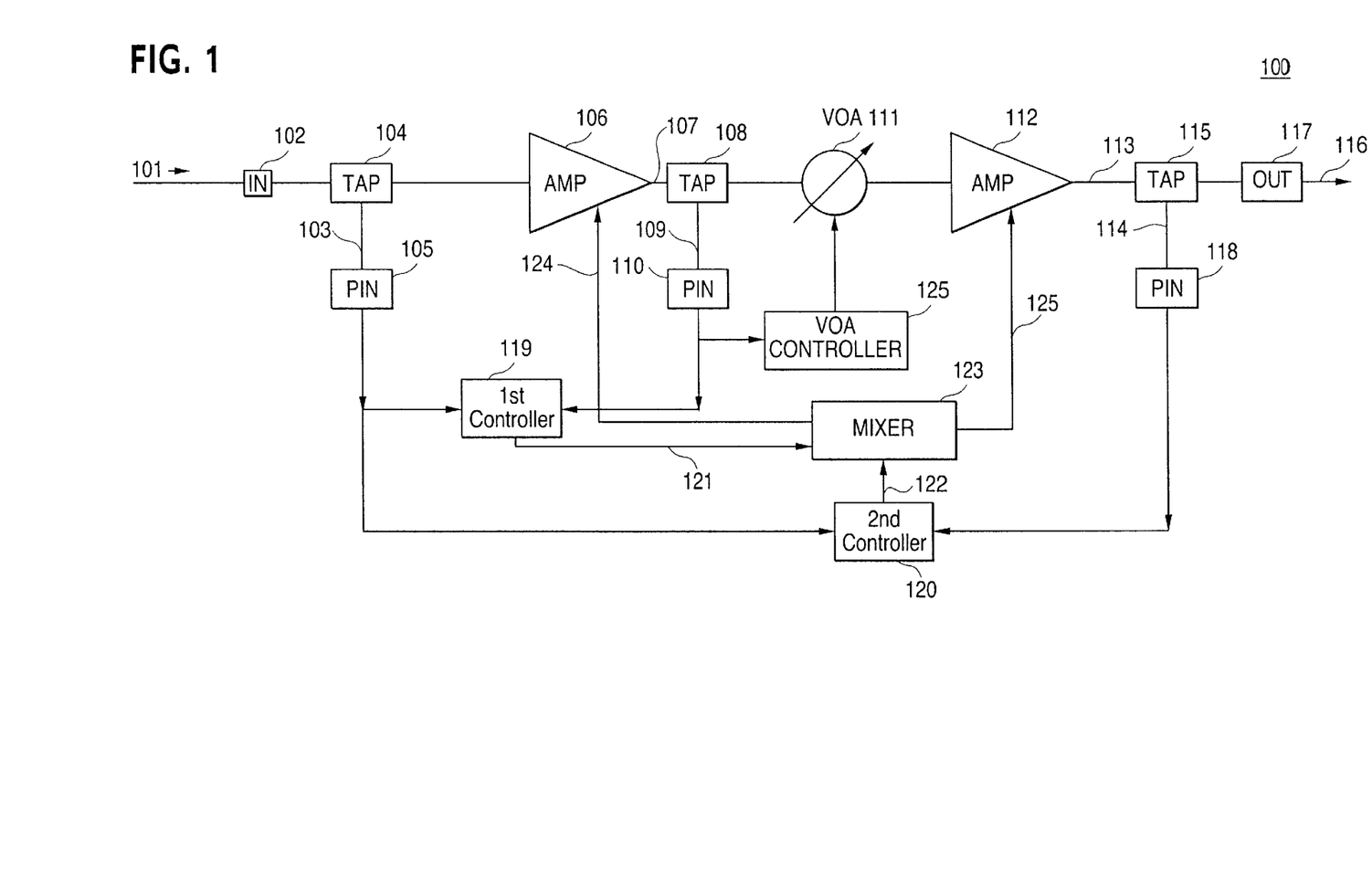
FIG. 1 is a block diagram of an optical amplifier including a controller in accordance with an exemplary embodiment of the present invention.

Turning to FIG. 1 an optical amplifier is shown. An input signal 101 is input to an input port 102. A portion 103 of the input signal 101 is branched off via a first optical tap 104. The portion 103 of the input signal 101 is incident upon a photodetector 105, illustratively a PIN photodetector. The remainder of the input signal is input to a first amplification stage 106. The output 107 of first amplification stage 106 is input to a second optical tap 108. A portion 109 of output 107 is branched off via the second optical tap 108 and is incident upon a second PIN detector 110. The remaining portion of the output 107 is incident upon a variable optical attenuator (VOA)111. The output from the variable optical attenuator 111 is input to a second amplification stage 112. The output 113 of second amplification stage 112 is incident upon a third optical tap 115. A portion 114 of the output 113 is branched off via third optical tap 115 to a third PIN detector 118. The remainder of the output 113 of the second amplification stage 112 is an output signal 116 of the optical amplifier 100 that is transmitted by an output port 117.

Illustratively, the optical amplifier 100 according to the exemplary embodiment of FIG. 1 is a two-stage variable gain amplifier. As is well known, optical amplifiers often include multiple stages. The use of multiple stages, among other reasons, is advantageous because it enables signal amplification without over-driving the amplifier. Ultimately, this enables the requisite amplification while maintaining signal quality. It is noted that for the purposes of clarity of discussion, a two-stage optical amplifier is illustrated. Of course, the present invention may be used with optical amplifiers having more than two stages as well as cascaded two-stage (or more) optical amplifiers. In addition the controller and method of the present invention may also include the capability to compensate for amplified spontaneous emission (ASE) as well as other sources of noise in a signal. Finally, while the optical amplifier is illustratively an EDFA-based optical amplifier, the controller and method of the present invention may be used to control other amplifiers to include Raman fiber-based amplifiers (RFA).

The optical amplifier 100 may operate in gain-control mode, output power-control mode or pump-current control mode. The control of optical amplifier 100 in either gain-control mode, output-power control mode or pump current control mode may be carried out in accordance with the teachings of the parent application incorporated by reference hereinabove. To this end, selection of the gain set-point of the amplification stages of the optical amplifier, and of the variable optical attenuator, to achieve a desired noise figure, gain tilt and ripple may be carried out illustratively in accordance with teachings of the parent application.

In accordance with exemplary embodiments of the present invention, effective transient control through the control of the current to the pump lasers of the amplification stages is effected to maintain the amplifier gain before, during and after a transient event (e.g., adding or dropping of channels). To this end, the first controller 119 receives portion 103 of the input signal 101 as well as portion 109 of the amplified output 107 from the first amplification stage 106. Based on these inputs and the gain set point based on operating condition characterized by input signal power and overall gain set point, a control signal 121 is sent from the first controller 119 to the mixer 123. The second controller 120 also receives portion 103 of input signal 101 and the gain set point ($G_{sp}$) for overall amplifier. This gain setpoint can be set by a user by sending a command to the controller via communication line (e.g., RS232 or Ethernet line). Additionally, the second controller 120 receives a portion 114 of the output 113 from the second amplification stage 112. Of course, this is representative of the output signal 116. The second controller 120 issues a second control signal 122 to the mixer 123 based on these inputs. Based on control signals 121 and 122 from the first and second controllers, respectively, mixer 123 issues control signals 124 and 125 to the first and second amplification stages 106 and 112, respectively. Control signals 121, 122, and 124 and 125 are the result of calculations carried out respectively by first controller 119, second controller 120 and mixer 123.

The mixer 123 usefully effects a balance of the amplification at various stages of amplifier 100. To this end, the control signal 122 from second controller 120 is used to determine the overall gain of the optical amplifier 100, which is matched with the overall gain set-point ($G_{sp}$). The control loop of first controller 119 is useful in achieving a gain set-point (e.g., $G_{sp1}$ as referenced in the parent application) determined in the optical tuning of the first amplification stage 106.

The control signal 124 enables control of a pump laser (not shown) in first amplification stage 106. The control loop of second controller 120 usefully enables the overall gain of the optical amplifier 100. However, because the pump laser of the first amplification stage 106 has contributed to the overall gain of optical amplifier 100, control signal 125, which controls the pump laser (not shown) of the second amplification stage 112, must be determined accounting for this contribution. This is a particularly useful aspect of the present invention. To this end, without the mixer 123, an imbalance in the contributions of the individual pump lasers can result. This can lead to one pump's being operated close to or in saturation or near the threshold region. This imbalance may result in poor performance during a transient event. As such, the mixer 123 substantially balances the input of first and second controllers 119 and 120, respectively, to ensure a balance of the input of the pump laser of the amplification stages of the optical amplifier 100.

It is noted that first controller 119, second controller 120 and mixer 123 may perform control calculations and/or retrieve data via a look-up table. The control calculations and/or look-up table values may be implemented via one or more processors. These processors are illustratively signal processors well known to one having ordinary skill in the art. Moreover, the first and second controllers 119 and 120, respectively, and mixer 123 enable improved transient response in the optical amplifier 100.

Finally, it is noted that, the VOA 111 is controlled by VOA controller 125 which receives a portion of the output of the photodetector 110. The VOA controller 125 issues commands to the VOA 111 that may be calculated by a method described in the parent application.

The invention of the present disclosure may be more fully understood through exemplary embodiments described in the example which follows. Of course, the example is meant to be merely illustrative of the present invention, and is no way limiting of the invention as set forth in the appended claims or the legal equivalents thereof.

EXAMPLE

Figure 2:
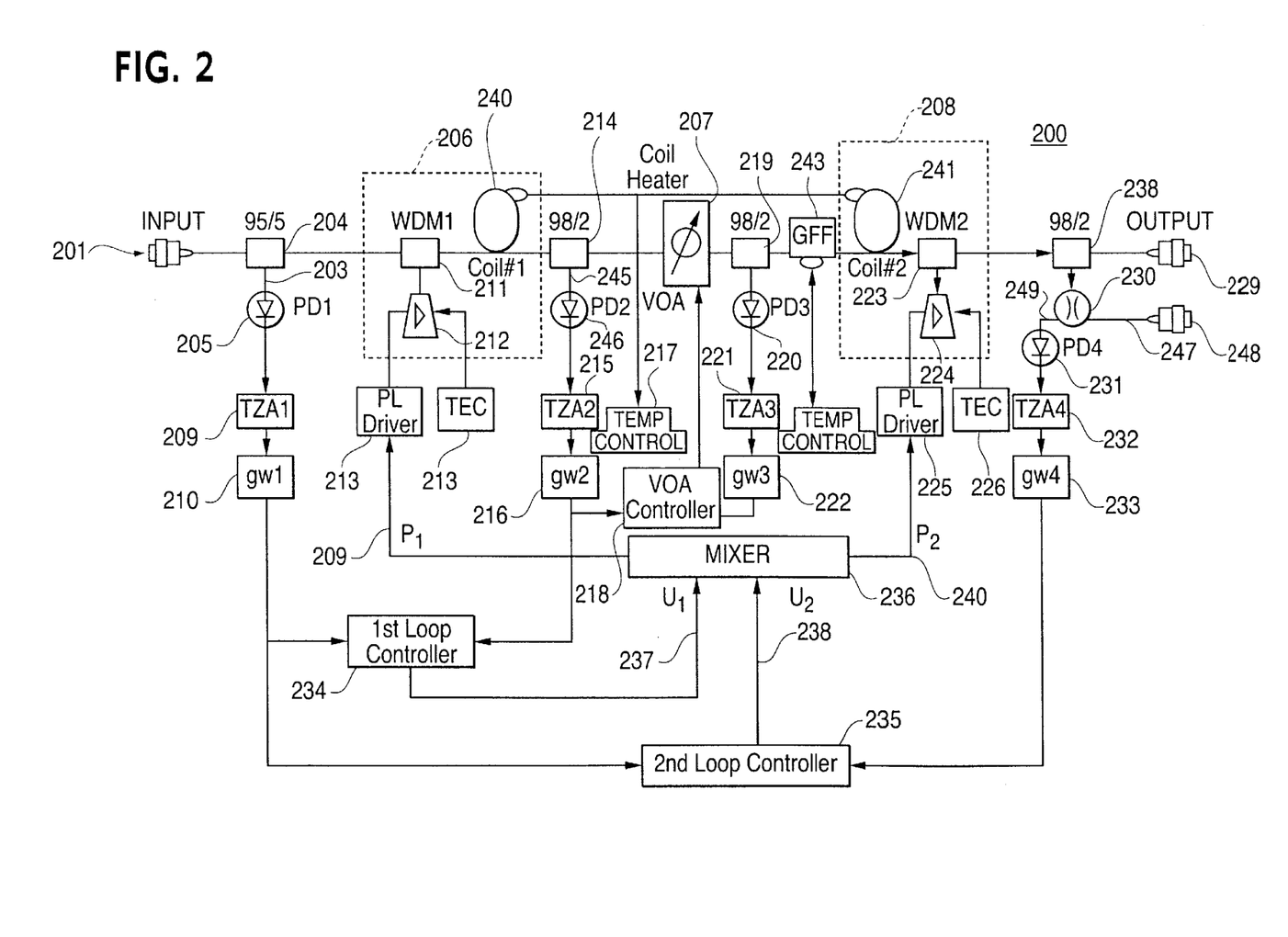
FIG. 2 is a block diagram of an optical amplifier including a controller in accordance with an exemplary embodiment of the present invention.

Turning to FIG. 2, an optical amplifier 200 in accordance with an exemplary embodiment of the present invention is shown. An input signal 201 illustratively from an optical communications system or a cascaded optical amplifier is received at input port 202. A first optical tap 204, illustratively a 95/5 tap, branches off a portion 203 of the input signal 201. The remainder of the input signal 201 may be incident upon an optical isolator (not shown). The optical isolator is a standard isolator that is used to reduce optical back reflections. The output from the optical isolator is incident upon a first amplification stage 206.

Portion 203 of input signal 201 is incident upon first photodetector 205. The first photodetector 205 converts the optical signal into an electrical signal which is input to a first transimpedance amplifier (TZA1) 209. The amplified signal from the first transimpedance amplifier 209 is input to a first gain switch (gw1) 210. First gain switch 210 is used in the path of first photodetector 205. The first gain switch 210 includes circuitry which effectively expands the measurement range and enables better resolution over the required input signal range and gain-setting conditions of the optical amplifier 200. Further details relating to the first gain switch 210 as well as other gain switches used in the present exemplary embodiment are described herein.

A large portion of the input signal 201 is output from tap 204 and input to first amplification stage 206. First amplification stage 206 includes a first wavelength division multiplexer 211, a first optical pump 212, and a section of rare-earth doped optical fiber 240, which may be a coil of rare-earth fiber of a particular length to achieve a particular level of gain. The first optical pump 212 is an energy source (e.g., a laser) which delivers optical power to create a desired level of inversion for a particular level of gain at the first amplification stage 206. The first wavelength division multiplexer 211 serves to efficiently couple the optical signal from the optical isolator (not shown) and the pump light into, or away from the rare-earth doped optical fiber 240. Illustratively, the rare-earth dopant is trivalent erbium, and the illustrative pump wavelength is 980 nm. Of course, other rare-earth dopants such as Thulium (Tm), Ytterbium (Yb) or Praseodymium (Pr) may be used.

The output signal from the first amplification stage 206 is input to a second optical tap 214. A portion 245 of the output of the first amplification stage 206 is branched off by second optical tap 214. This portion 245 is converted into an electrical signal via second photodetector 246, and the output thereof is input to a second transimpedance amplifier (TZA2) 215. The output from the second transimpedance amplifier 215 is input to a second gain switch 216 (gw2). The optical tap 214 is illustratively a 98/2 optical tap. Therefore, a large portion of the output of first amplification stage 206 is input to a variable optical attenuator 207. After a pre-determined degree of attenuation by the variable optical attenuator (VOA) 207, the signal is incident upon a gain-flattening filter (GFF) 243. It is noted that the first pump laser 212 includes a first thermo-electric cooler and associated driver 227. Moreover, it is noted that temperature controllers 217 and 244 usefully maintain the temperature of first and second rare-earth doped optical fibers 240 and 241, respectively.

The output of the variable optical attenuator 207 is input to a third optical tap 219, which is illustratively a 98/2 optical tap. Third optical tap 219 diverts a portion of the output from the variable optical attenuator 207 to a third photodetector 220. The third photodetector 220 converts this optical signal into an electrical signal which is representative of the output of the variable optical attenuator (VOA). The electrical signal output from the third photodetector 220 is input to a third transimpedance amplifier 221 (TZA3). The output from third transimpedance amplifier 221 is input to a third gain switch 222 (gw3). The output of the third gain switch 222 is input to a VOA controller 218. The VOA controller 218 issues control commands to the VOA 207. The control commands may be determined using the illustrative methods described in the parent application. The VOA is usefully a relatively fast VOA needed to effect attenuation to control transients. Illustratively, VOA 207 has a response time in the range of approximately 10 $\mu$s to approximately 300 $\mu$s. It is noted that if a "fast" VOA is not included, the VOA cannot be effectively used for transient control. A "slower" VOA would be used for VOA 207, contributing to gain control in steady-state, after transients have settled.

The output of the gain-flattening filter 243 is incident upon a second amplification stage 208. Like the first amplification stage 206, second amplification stage 208 is illustratively a rare-earth doped fiber amplifier, which includes a second optical pump 224, a second wavelength division multiplexer 223, and second section of rare-earth doped fiber 241. The second pump laser 224 also includes a second thermoelectric cooler and associated driver 226. The functions of the elements of the second amplification stage 208 are substantially the same as that described in connection with first amplification stage 206. As such, details thereof are omitted in the interest of brevity.

Output from the second amplification stage 208 is incident upon a fourth optical tap 228, which is again, illustratively, a 98/2 optical tap. A large majority of the optical signal is transmitted by the fourth optical tap 228, and is output through an output port 229 as the output optical signal. This may be then input to an optical communications system (not shown), or input to one or more cascaded optical amplifiers (not shown). The other portion of the output from the second amplification stage is split-off by the fourth optical tap and is incident upon a splitter 230. The splitter 230 is illustratively a 50/50 coupler, and splits a portion 247 to a monitoring port 248. The remaining portion 249, is incident upon a fourth photodetector 231. The output of fourth photodetector 231 is an electrical signal representative of the output optical signal of the optical amplifier 200. The output of fourth photodetector 231 is sent to a fourth transimpedance amplifier (TZA4) 232 and a fourth gain switch (gw4) 233. After each of the transimpedance amplifiers (209, 215, 221 and 232) a lowpass filter may be used to remove high frequency components present in the signal prior to sampling.

A useful aspect of the invention of the present disclosure surrounds an illustrative method and apparatus for controlling the first and second pump lasers 212 and 224. According to an exemplary embodiment of the present invention, this is carried out through the use of a first loop controller 234, a second loop controller 235 and a mixer 236. Additionally, the variable optical attenuator 207 is adjusted for optimal attenuation using the VOA controller 218.

The controller in accordance with an exemplary embodiment of the present invention includes a first loop which surrounds the first amplification stage 206 and includes the first loop controller 234; and a second loop which surrounds the entire optical amplifier 200 and includes second loop controller 235. A first control signal 237 ($u_1$) is input to mixer 236 from first loop controller 234. A second control signal 238 ($u_2$) is input to mixer 236 from second loop controller 235. The first control signal 237 and second control signal 238 are current control signals which are calculated respectively in first loop controller 234 and second loop controller 235. Further details of the method of calculation of the first and second control signals 237 and 238, respectively, are described in further details herein. Finally, mixer 236 performs further calculations after receiving first and second control signals 237 and 238, respectively. The mixer 236 calculates a first pump control signal 239 ($P_1$) and a second pump control signal 240 ($P_2$) based on first and second control signals 237 and 238, respectively.

After completion of these calculations, first pump control signal ($P_1$) 239 is input to a first pump laser driver 213; and second pump laser control signal ($P_2$) 240 is input to a second pump laser driver 225. As can be appreciated, the first and second pump laser drivers, 213 and 225 respectively, adjust respective drive currents respectively to first pump laser 212 and second pump laser 224. Finally, it is noted that in the present exemplary embodiment, the controller is operating in gain-control mode. Of course, as referenced above, this is merely illustrative, and other control modes may be chosen including output power control mode and input current control mode. Of course, the calculations for the first control signal 237, second control signal 238, first pump control signal 239, and second pump control signal 240 would be modified from those described in connection with the exemplary embodiment which centers on gain-control mode.

The first control loop, which includes the first loop controller 234, acquires information about input and output optical power of the first amplification stage 206 through sample outputs from the first photodetector 205 at the input of the optical amplifier 200, and from second photodetector 246 at the output of the first amplification stage 206. The gain-set point for the first loop, $G_{SP1}$, is determined in accordance with the teachings of the parent application. The first control signal 237 from the first loop controller 234 is calculated using the desired set-point $G_{SP1}$, and the samples of input power and output power of the first amplification stage (i.e., from first and second photodiodes 205, 246, respectively).

According to an illustrative embodiment of the present invention, the first control signal 237 ($u_1$) at a time, k, is given by:

$$u_1(k)=u_1(k-1)+2^{n1}*(A_1*e_1(k)+B_1*e_1(k-1)) \quad (1)$$

where $u_1(k-1)$ is the control signal calculated based on data from the last sampling time (k-1); $A_1$, $B_1$ are the proportional-integral (PI) controller parameters of the first control loop; and $n_1$, is the number of bits to shift which is part of the controller gain. This parameter $n_1$ is characteristic of a digital version of a proportional-plus-integral (PI) control calculation, implemented in a digital signal processor. By shifting the bits effective scaling of control parameters is accomplished.

Moreover, the error signal, $e_1$, at time k is given by:

$$e_1(k)=T_1(k)*G_{sp1}-T_2(k) \quad (2)$$

where $T_1(k)$ and $T_2(k)$ are the readings at time k from the first and second photodetectors 205 and 246, respectively.

It is noted that the calculation of the control signal in equation (1) is a form of well-known proportional-plus-integral (PI) control law. It is further noted that this is merely exemplary, and the first control signal 237, $u_1$, may be calculated using other control methods known to one having ordinary skill in the art. Examples of these control methods include, but are not limited to, control by use of a look-up table, optimal control, and fuzzy-logic based control.

As stated above, the second loop, which includes second loop controller 235, is useful in the control of the overall optical amplifier 200. This second loop introduces second loop control signal 238 ($u_2$). The second control signal 238 may be calculated using a modified error signal calculated by an illustrative technique described. The error signal is modified for reasons described presently.

The optical amplifier 200 according to an exemplary embodiment of the present invention operates over a relatively wide dynamic range. Conventional analog-to-digital converters, which are incorporated into the controller according to an exemplary embodiment of the present invention, generally cannot function over a dynamic range which is as great as that of the optical amplifier 200. As such, first, second, third, and fourth gain switches, 210, 216, 222, and 233, respectively, are used to expand the relatively limited dynamic range of analog-to-digital (A/D) converters. To this end, when an input signal to a photodetector is below a certain threshold, the gain switch selects the high value of gain to provide more amplification of the input signal. When the input signal has a power level that is above a certain threshold, the gain switch changes its gain to a lower value. It is noted that the sampling of the input signal 201 is carried out using an analog-to-digital converter(s) (not shown). The sampling is controlled by a clock signal from a digital signal processor (DSP) (again, not shown). Moreover, sampling of the optical signal at various stages of the optical amplifier 200 may be carried out in a similar manner.

Illustratively, the low gain value is normally equal to approximately one, while the high gain value is usually between 8 and 32, depending on the operating dynamic range of the input signal 201. As such, the gain switches effectively expand the dynamic range of the A/D converters. However, due to the existence of a small calibration error which can occur during the gain switching, and a gain switching time delay, the gain-switching may cause a substantial transient discontinuity (spike), discussed in more detail below. To avoid these spikes, the control loop which includes first loop controller 234, second loop controller 235, and mixer 236 checks the input signal 201 at each sampling interval (e.g. at time (k−1), k, (k+1), etc.) to determine if it has reached the threshold for gain-switching. If the threshold has been reached, the controller will "skip" a certain number of samples. Illustratively, four samples spanning an approximately 10 μs interval are skipped.

As described, the gain switches (210, 216, 222, 233) may introduce artificial spikes in the signal received by the first controller 234, second controller 235 and mixer 236. As can be appreciated, these are not true spikes in the optical signal, but rather are introduced by the gain switches. These spikes are usefully avoided according to exemplary embodiments of the present invention by "skipping" a certain number of samples as described above. It is necessary, however, to estimate the values of the input signal 201 that were "skipped" during the electronic gain switching. The estimated values may be determined as presently described.

To estimate the power of input signal 201 due to skipped readings, a compensation term is used. This compensation term is a signal conditioning term which is used to avoid discontinuities in the error signal. These discontinuities in the error signal would be manifest as discontinuities in the pump current(s) and could adversely impact the output power of the optical amplifier. The compensation term at time k (Comp(k)) is the integration (filtering) of the modified slope of the total input signal change. The compensation term may be expressed as:

$$\text{Comp}(k) = (1-\delta) * \text{Comp}(k-1) + \text{Slope}(k) \tag{3}$$

where $1-\delta$ equals the pole of the filter; and $\delta$ equals a constant ($0 < \delta \leq 1$). The Slope(k) which equals the difference between current and previous readings from PD1 photodiode is given by:

$$\text{Slope}(k) = \frac{T_1(k) + T_1(k-1) - T_1(k-2) - T_1(k-3)}{4} \tag{4}$$

where $T_1(k)$ equals the present photodiode reading of photodetector 205 (at time k); $T_1(k-1)$ equals photodiode reading (from photodetector 205) from the previous sampling instant; $T_1(k-2)$ equals photodiode reading (from photodetector 205) at sampling instant two intervals prior; and $T_1(k-3)$ equals photodiode reading at sampling instant three intervals prior.

It is noted that in steady state conditions, when the optical power of the input signal 201 does not substantially change, the slope defined by equation (4) is substantially zero. The above equation is illustrative, and accordingly may have alternative forms. For example, if input signal 201 is very noisy, more than four samples of the power of input signal 201 may be included.

The error signal which has been modified to account for gain switch discontinuities in the second control loop is given by:

$$e_2(k) = [(T_1(k) + C * \lfloor \text{Comp}(k) \rfloor) * G_{SP} - T_4(k)] * \frac{1}{\lfloor T_1(k) \rfloor} \tag{5}$$

where $\lfloor \bullet \rfloor$ equals a "floor" function defined below; $G_{SP}$ equals gain set point for the second control loop, and which is equal to overall required gain; $T_1(k)$ equals the sampled value of the first photodetector 205 at time instant k; $T_4(k)$ equals the sampled value of the photodetector 231 at time instant k; and C is an experimentally determined constant; and Comp(k) is the compensation term previously described.

The floor function is defined as:

$$\lfloor f(x) \rfloor = \begin{cases} f(x), & \text{if } f(x) \geq \text{limit} \\ \text{limit}, & \text{if } f(x) < \text{limit} \end{cases} \tag{6}$$

The floor function for the compensation term, Comp(k), for equation (5) is illustratively set to zero (i.e., the floor function is greater than or equal to zero). The floor function limit for the photodiode reading of first photodetector 205 is illustratively set at −26 dBm, because lower values of the photodiode reading from first photodetector 205, if corrupted by noise, would result in a rather large random change in the error signal of equation (5). It is noted that another possible source of noise for a relatively low input power level of input signal 201 is limited by the word length of an analog-to-digital (A/D) converter which may be used in the various controllers of the illustrative embodiment. The floor function effectively mitigates this potential problem.

It can be shown that the second control signal ($u_2(k)$) may be expressed as:

$$u_2(k) = u_2(k-1) + 2^{n_2} * (A_2 * e_2(k) + B_2 * e_2(k-1)) \tag{7}$$

where $u_2(k)$ is the control signal at time k;

$u_2(k-1)$ is the control signal at last sampling instant;

$A_2$, $B_2$ are the Proportional-Integral (PI) controller parameters of the control loop; and $n_2$ is the number of bits to shift, which is part of the controller gain and is used for scaling of control parameters as described previously in connection with $n_1$ of eqn. (1).

In addition to other aspects of the present invention, one particularly useful feature of the exemplary embodiment of the present invention is the prevention of "railing" of the pump lasers 212 and 224. "Railing" is the term that is used to describe the condition where a pump laser swings from maximum output to minimum output. Moreover, it is detrimental to have a pump laser driven at maximum for any extended period of time. As can be appreciated, overdriving and railing may reduce the lifetime of the pump laser significantly. As such, it is useful to have a limit-and-resetting method on both first pump laser 212 and second pump laser 224. To this end, assuming that first pump laser 212 has a maximum pump current which corresponds to a first maximum pump control signal $P_{1max}$; and the second pump laser 224 has a maximum pump current which corresponds to a second maximum pump control signal $P_{2max}$, then the limit-checking and resetting method in accordance with an exemplary embodiment may be shown to be:

$$u_2(k) - P_{2max} \leq u_1(k) \leq P_{1max} - u_2(k) \tag{8}$$

$$0 \leq u_2(k) \leq 0.5 * (P_{1max} + P_{2max}) \tag{9}$$

If the first control signal $u_1(k)$ or the second control signal $u_2(k)$ exceeds its respective upper and lower limit in equations (8) and (9), they will be replaced/reset by their respective upper and lower limits. It is further noted that the limit-checking and resetting as quantified by equation (9) has an upper limit of the average of the two maximum drive currents and has been experimentally found to be an optimal way to prevent railing in the pump lasers.

The derivation of equations (8) and (9) is relatively straight forward, and may be based on the method of determining the first and second pump laser control signals 239 and 240, respectively. This method is further described in further detail below. To wit, the first pump laser control signal ($P_1$) 239 and the second pump laser control signal 240 ($P_2$) may be expressed in terms of the first and second loop control signals, $u_1$, 237 and $u_2$, 238, respectively:

$$P_1(k) = u_2(k) + u_1(k) \tag{10}$$

$$P_2(k) = u_2(k) - u_1(k) \tag{11}$$

where:

$P_1(k)$ is the pump control signal 239 for first pump laser 212 at the current sampling instant (k); and $P_2(k)$ is the pump control signal 240 for the second pump laser 224 at the current sampling instant (k).

From equation (10), it follows:

$$u_1(k) = P_1(k) - u_2(k) \tag{12}$$

Since $P_1(k) \leq P_{1max}$, it follows that:

$$u_1(k) \leq P_{1max} - u_2(k)$$

which is the right half of the inequality of equation (8). From equation (11) it follows that:

$$u_1(k) = u_2(k) - P_2(k) \tag{13}$$

Since $P_2(k) \leq P_{2max}$, we have $u_1(k) \geq u_2(k) - P_{2max}$ which is the left half of the inequality of equation (8). Equation (9) may be proved similarly by adding equations (10) and (11) together and dividing both sides by two.

It is noted from equation (8) that $u_1(k)$ can take both positive and negative values as long as $u_2(k)$ is not equal to $P_{1max}$ or $P_{2max}$. This is a useful aspect of the loop control method which incorporates the first loop controller 234 and the second loop controller 235. To this end, this substantially avoids the problem of cutting off the negative control signal when $u_1(k)$ and $u_2(k)$ are directly applied to pump laser 212 and pump laser 224 without input from mixer 236.

As described previously, the mixer 236 combines the first and second control signals 237 and 238, respectively, to effect overall control of the optical amplifier 200. After limiting and resetting in accordance with the illustrative method described above, the first control signal 237 and second control signal 238 are combined in the mixer stage, and first pump control signal 239 and second pump control signal 240 are sent to respective pump lasers 212 and 224. The mixer 236 calculates the first and second pump laser control signals 239 at a particular time k ($P_1(k)$ and 240 $P_2(k)$, respectively) according to the following equations:

$$P_1(k) = \lfloor u_2(k) + u_1(k) \rfloor \tag{14}$$

$$P_2(k) = \lfloor u_2(k) - u_1(k) \rfloor \tag{15}$$

where $P_1(k)$ 239 is the pump laser control signal (current control signal) sent to the first pump laser 212, and $P_2(k)$ 240 is the second pump laser control signal (current control signal) sent to the second pump laser 224. It is noted that the floor function limits in equations (14) and (15) are set to zero, because power values below zero are not physically meaningful. The mixer 236 usefully incorporates input from first loop controller 234 and second loop controller 235. The second loop control signal 238 is useful in setting the overall gain of the amplifier to the gain-set point. The first control loop, which includes first loop controller 234, is maintains the gain of the first amplifier stage defined by gain-set point ($G_{sp1}$) that is determined in the optical tuning of the first amplifier stage 206. The second loop controls the overall gain of the optical amplifier 200. However, the first amplification stage 206 has contributed to the overall gain of optical amplifier 200. Accordingly, the method of the exemplary embodiment accounts for this fact (subtracts the first control signal $u_1(k)$ from the second control signal $u_2(k)$ in eqn.(15))in determining the second pump control laser signal $P_2(k)$. The mixer 236 which performs the calculations of $P_1$ and $P_2$ issues these pump control lasers signals. In this way the mixer balances the amplification stages for optimal performance as referenced above.

Exemplary Performance of the Controller

The various aspects of the exemplary method and apparatus described above in the example may be better understood through a discussion of experimentally determined performance of an optical amplifier including the exemplary control method and apparatus.

Figure 3:
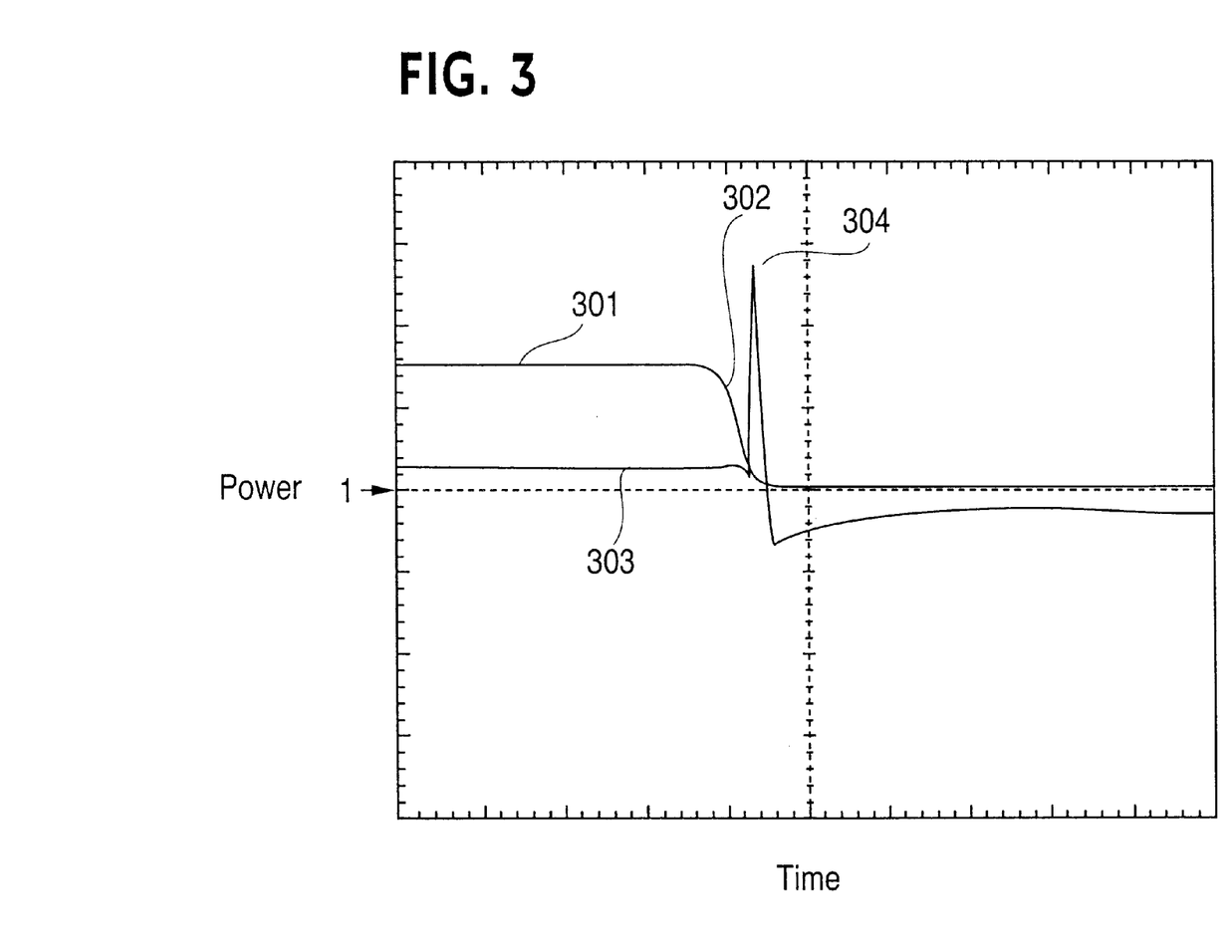
FIG. 3 is a graphical representation showing the transient response of a surviving channel due to electronic gain switching when controlling does not include skipping.

Turning to FIG. 3, a plot of the total input power over time is shown. In this exemplary graphical illustration, the controller incorporates no "skipping" of samples of input signal 201. This results in a large spike due to the electronic gain switching of gain switches GW1–GW4. To this end, the electronic gain switches are used to expand the operating range of amplifier as described above. Without the "skipping" technique described above, spikes can occur in the surviving channel. To this end, 301 is a graphical representation of the total input power, showing a drop in total input power due to the dropping of a number of channels as at 302. The surviving channel power 303 experiences a significant discontinuity (spike) 304 as shown.

As described above in more detail in the parent application, transient spikes such as this can have significant adverse effects on the bit-error rate of an optical signal. Moreover, such transient spikes can damage optical receivers, especially when more that one amplifier is used in a cascaded arrangement.

Again, as mentioned above, to alleviate spikes such as spike 304 in the surviving channel power, the overall loop control method of the exemplary embodiment of the present invention checks the input signal to the respective photodetectors in each sampling interval to see if a particular threshold for gain switching has been reached. As is described above, it is necessary to estimate the value of the power of input signal 201 to replace the "skipped readings" in the various control methods described above. To this end, the estimated values may be calculated based upon the previous measured value, plus the slope:

$$\hat{T}_1(k) = T_1(k-1) + \text{Slope}(k) \tag{16}$$

where $\hat{T}_1(k)$ is the estimate of the reading of PD1 205 at time instant k; and $T_1(k-1)$ is the previous reading from PD1 205 at the previous instant k−1.

It is further noted that Slope(k) in equation (16) is calculated as in equation (4) described above.

From the above compensation technique described in accordance with an exemplary embodiment of the present invention above, the transient response of the optical amplifier is significantly improved.

Figure 4:
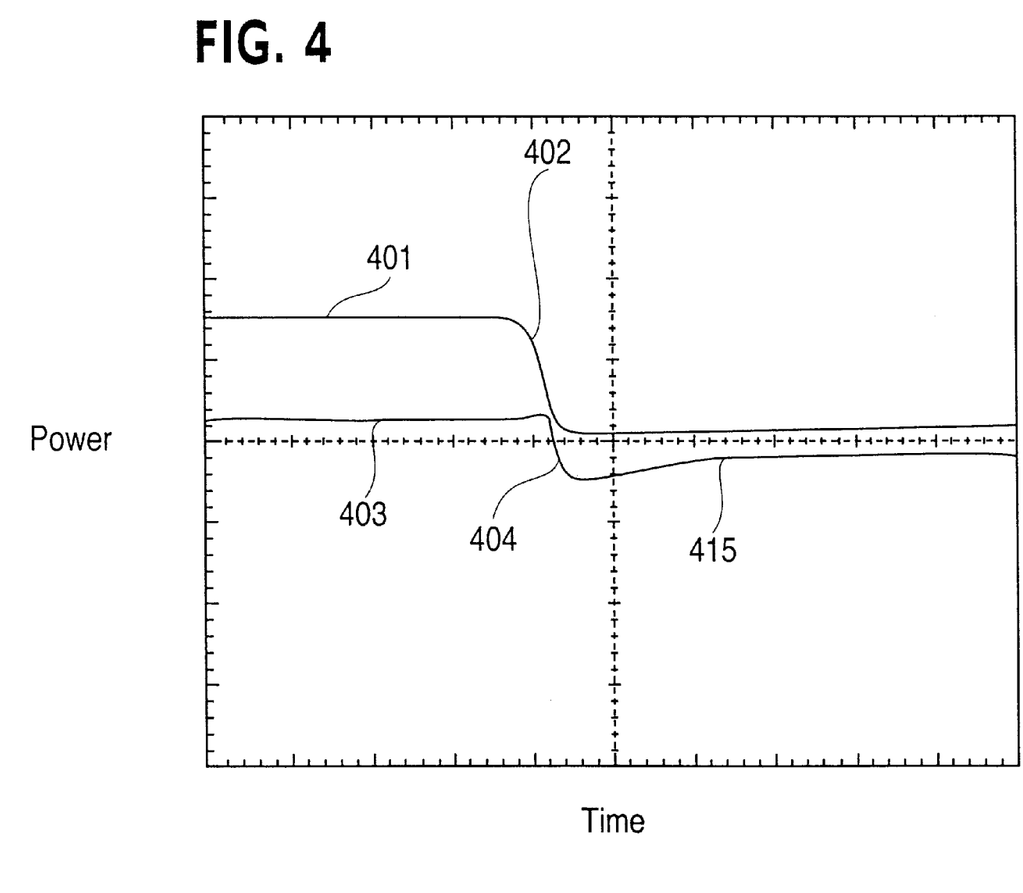
FIG. 4 is a graphical representation showing the transient response of a surviving channel due to electronic gain switching when a controlling includes skipping in accordance with an exemplary embodiment of the present invention.

Turning to FIG. 4, the compensation including "skipping" when incorporated to the overall control technique of the present invention effectively eliminates the spike. To this end, 401 shows the total input power of an optical signal. At 402, a reduction in the total input power is experienced due to the dropping of a number of channels. The surviving channel trace 403 experiences a corresponding drop in power at 404, leveling off at 405. As can be seen, there are substantially no transient spikes, and achieving steady state conditions at 405 occurs relatively quickly. This ultimately results in a significant improvement in bit-error rate when compared to conventional techniques for controlling optical amplifiers.

As noted previously, the mixer plays an important role in controlling the optical amplifier 200 of the exemplary embodiment of the present invention. Without a mixer (such as mixer 236), the calculated first control signal $u_1(k)$ would be driving the first pump laser alone, and the calculated second control signal $u_2(k)$ would be driving the second pump laser only. The problem with this technique is that the whole amplifier gain control has already been partially accounted for by the first amplifier stage 206, a fact that is not taken into account in the overall control scheme. The effect of not having a mixer in accordance with the exemplary embodiments of the present invention is that an imbalance between the two pumps may occur, leading one pump laser close to or already in saturation. Moreover, this could also result in one pump laser operating at very low levels. The imbalance between the pump lasers may result in poor performance during transient conditions such as during adding or dropping of channels. To this end, once one of the pump lasers is in saturation or is at a minimum power level, the control loop is no longer a closed-control loop because the control signal is no longer related to the error signals between the input and output of that particular control loop.

Figure 5:
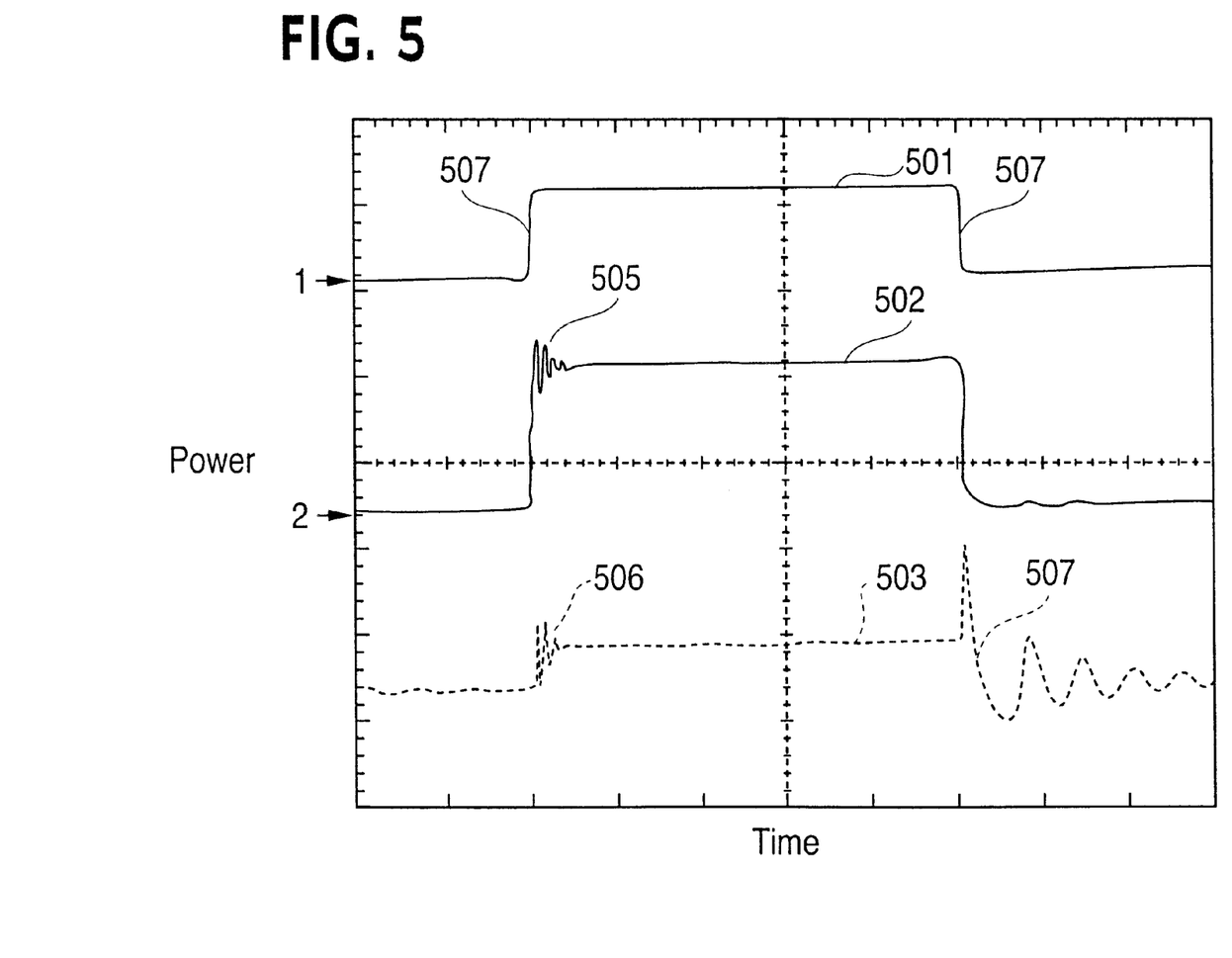
FIG. 5 is a graphical representation of the total input power, total output power and surviving channel power of an optical amplifier without incorporation of a controller in accordance with an exemplary embodiment of the present invention.

FIG. 5 illustrates the performance of a controller without the control structure and method in accordance with exemplary embodiment of the present invention. As seen in FIG. 5, the total input power 501, total output power 502 and surviving channel 503 are shown over time. At 504, a number of channels are added. This results in poor transient response in both the total output power at 505, and particularly in the surviving channel power at 506. Moreover, when a number of channels are dropped as at 507, the transient response of the surviving channels is unacceptable.

The compensation term as set forth in equation (3) in the overall loop control in accordance with an exemplary embodiment of the present invention represents a modified feed-forward term of the controller, since the control signal of this term is derived only from the input signal 201. Moreover, the compensation term of equation (3) may be viewed as a filtered slope signal. Finally, the compensation term of equation (3) may also be viewed as an integration of the slope signal.

Figure 6:
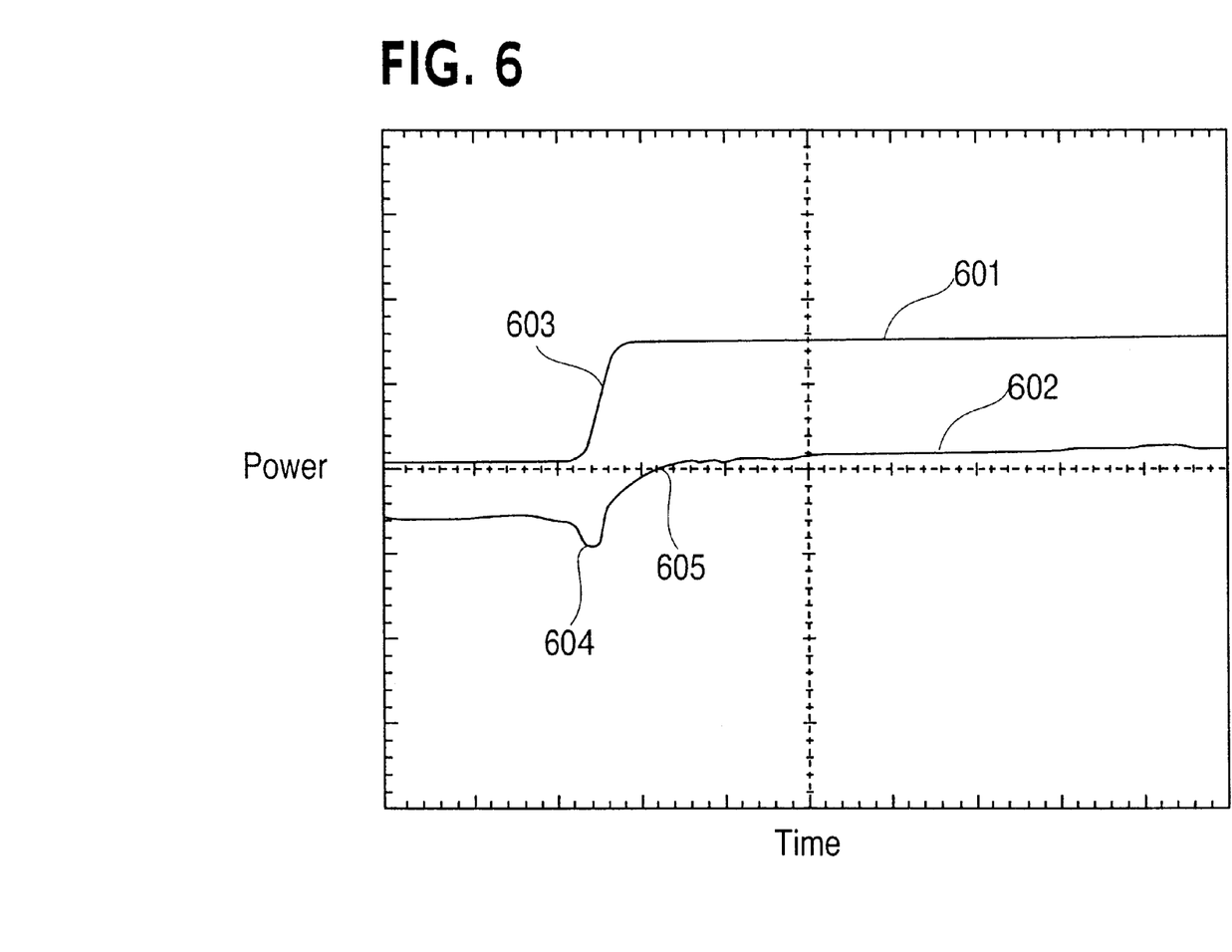
FIG. 6 is a graphical representation showing the total input power and surviving channel power of an optical amplifier including a controller without a feed-forward compensation term.

Turning to FIG. 6, the total input power 601 and surviving channel power 602 are shown over time. At 603, a number of channels are added. As can be seen, the surviving channel power takes a significant drop at 604, and recovers at 605. This is representative of the optical amplifier which does not include the feed-forward compensation term as set forth in equations (3) and (5) of the exemplary embodiment of the present invention.

Figure 7:
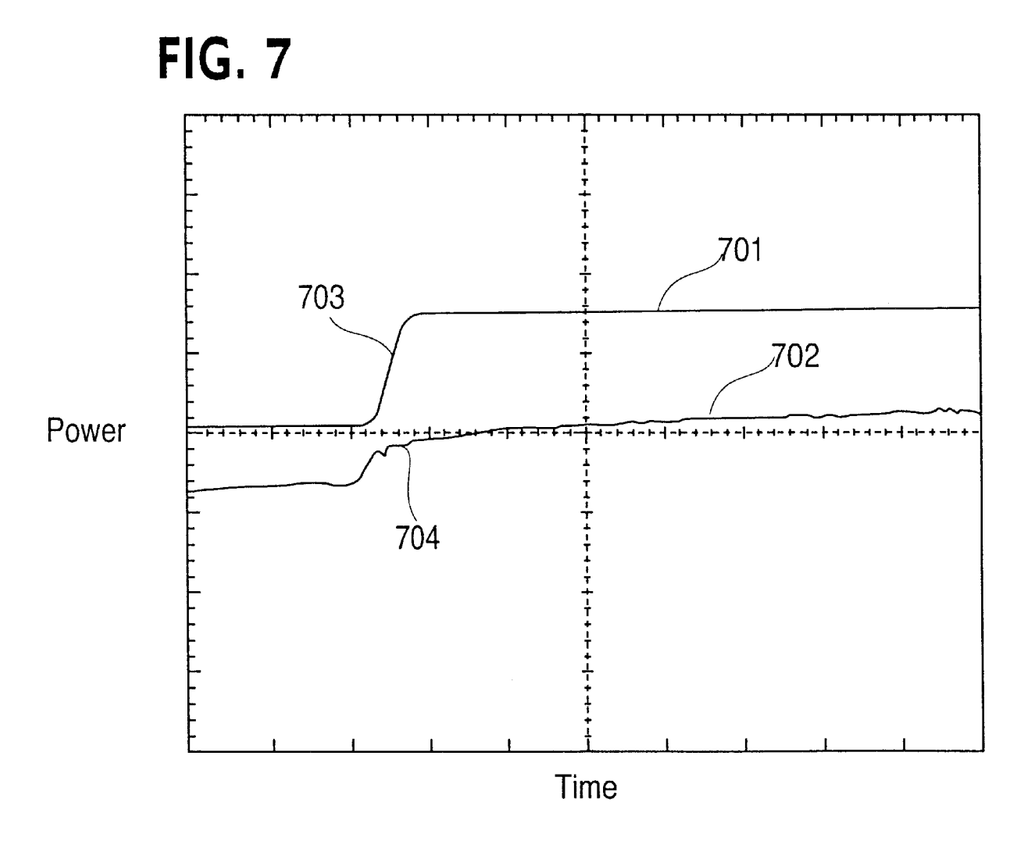
FIG. 7 is a graphical representation of total input power and surviving channel power with feed-forward compensation in the controller in accordance with an exemplary embodiment of the present invention.

Turning to FIG. 7, significant improvement in the transient response may be seen as a result of inclusion of the compensation term of equations (3) and (5) of the exemplary embodiment of the present invention. To this end, 701 represents the total input power and 702 the surviving channel power over time. At 703, a large number of channels are added, and as can be seen at 704, the surviving shows substantially no undesirable undershoot.

The compensation term of equation (3) effectively compensates for any undershoot in the surviving channel transient when channels are added. In the illustrative embodiment described above, FIG. 6 shows the surviving channel transient when 32 channels are added. Likewise, the same addition of 32 channels shows a marked improvement in the transient response of surviving channel power 702 shown in FIG. 7 as a result of the compensation term of the present invention.

As can be appreciated, the control methods and apparati in accordance with above-described exemplary embodiments of the present invention significantly improve the control of an optical amplifier, particularly during transient conditions. Moreover, the control method and apparatus of the exemplary embodiment described above improves the lifetime of the various elements, particularly the pump laser, by avoiding "railing", overdrive and underdrive conditions. Of course, there are other advantages that will be readily apparent to one having ordinary skill in the art.

The invention having been described in detail in connection through a discussion of exemplary embodiments, it is clear that various modifications of the invention will be apparent to one having ordinary skill in the art having had the benefit of the present disclosure. Such modifications and variations are included within the scope of the appended claims.

We claim:

1. A method of controlling an optical amplifier, the method comprising:

receiving a portion of an output signal from a first amplification stage;

receiving a portion of an output signal from a second amplification stage; and providing a mixer which receives a first signal indicative of said portion of said first amplification stage and a second signal indicative of said portion of a second amplification stage, and which adjusts an operating setting of said first amplification stage and adjusts an operating setting of said second amplification stage to substantially balance said operating settings based on said received signals, wherein neither said first nor said second amplification stage is at or near a saturation region of operation, or near a threshold region of operation.

2. A method as recited in claim 1, the method further comprising adjusting a variable optical attenuator based on said output signal of said first amplification stage.

3. A method as recited in claim 1, wherein said adjusting further comprises:

receiving a first control signal from a first loop controller;

receiving a second control signal from a second loop controller; and issuing a first pump control signal and a second pump control signal based on said first and second control signals.

4. A method as recited in claim 3, wherein said mixer issues said first and second pump control signals.

5. A method as recited in claim 4, wherein said mixer calculates said first and said second pump control signals.

6. A method as recited in claim 3, wherein said first and second pump control signals are issued to a first pump laser driver and a second pump laser driver, respectively.

7. A method as recited in claim 4, wherein said first and second control signals are received by said mixer.

8. A method as recited in claim 1, the method further comprising:

providing at least one gain switch;

receiving a portion of said input signal at said gain switch; and adjusting a gain of said received input signal based on a threshold criterion.

9. A method as recited in claim 8, wherein said gain has a low value of unity and a high value in the range of approximately 8 and approximately 32.

10. A method as recited in claim 8, wherein a sampling is halted for a period of time if said adjusting of said gain occurs.

11. A method as recited in claim 10, wherein said second loop controller estimates said input signal during said halted period of time.

12. A method as recited in claim 11 wherein said estimating further comprises:

calculating a compensation term;

calculating an error signal based on said compensation term; and calculating said second control signal based on said error signal.

13. A method as recited in claim 12, wherein said calculating said compensation term further includes calculating a slope based on a plurality of photodetector readings.

14. An optical amplifier, comprising:

a mixer, which receives a first signal indicative of a portion of a first amplification stage and a second signal indicative of a second portion of a second amplification stage, and which adjusts an operating setting of said first amplification stage and adjusts an operating setting of said second amplification stage to substantially balance said operating settings based on said received signals, wherein neither said first nor said second amplification stage is at or near a saturation region of operation, or near a threshold region of operation.

15. An optical amplifier as recited in claim 14, further comprising a variable optical attenuator.

16. An optical amplifier as recited in claim 14, wherein said controller further comprises:
   a first loop controller; and
   a second loop controller.

17. An optical amplifier as recited in claim 16, wherein said mixer receives a first control signal from said first loop controller and a second controller signal from a second loop controller.

18. An optical amplifier as recited in claim 17, wherein said mixer calculates a first pump control signal and a second pump control signal based on said received first and second control signals.

19. An optical amplifier as recited in claim 14, wherein another portion of said output signal is input to another optical amplifier.

20. An optical amplifier as recited in claim 18, further comprising a first pump laser driver which is connected to said first amplification stage and a second pump laser driver which is connected to said second amplification stage.

21. An optical amplifier as recited in claim 20, wherein said first and second pump laser drivers receive said first and second pump control signals, respectively.

22. An optical amplifier as recited in claim 14 further comprising:
   at least one gain switch which receives a portion of said input signal, and which adjusts a gain of said received input signal based on a threshold criterion.

23. An optical amplifier as recited in claim 14, further comprising:
   a plurality of gain switches each, of which receive a respective portion of an optical signal at respective stages of the optical amplifier, and each of which adjusts a gain of said respective received signal based on a respective threshold criterion.

24. An optical amplifier as recited in claim 22, wherein said gain has a low value of approximately one and a high value in the range of approximately 8 to approximately 32.

25. An optical amplifier as recited in claim 22, wherein a sampling of said input signal is halted for a period of time if said adjusting of said gain occurs.

26. An optical amplifier as recited in claim 25, wherein said second loop controller estimates said input signal during said halted period of time.

27. An optical amplifier as recited in claim 26, wherein said second loop controller:
   calculates a compensation term;
   calculates an error signal based on said compensation term; and
   calculates said second control signal based on said error signal.

28. An optical amplifier as recited in claim 27, wherein said error signal includes said estimated input signal.

* * * * *